(12) United States Patent
Bostian et al.

(10) Patent No.: US 6,339,793 B1
(45) Date of Patent: Jan. 15, 2002

(54) READ/WRITE DATA SHARING OF DASD DATA, INCLUDING BYTE FILE SYSTEM DATA, IN A CLUSTER OF MULTIPLE DATA PROCESSING SYSTEMS

(75) Inventors: Laura Margaret Bostian, Tivoli; John Lee Brooks, Lake Katrine; William James Schoen, Poughkeepsie, all of NY (US); Jimmy Paul Strickland, Saratoga; Walter James Kincaid, Peeble Beach, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,233

(22) Filed: Apr. 6, 1999

(51) Int. Cl.[7] .............................................. G06F 13/00
(52) U.S. Cl. ............................ 709/229; 707/9; 707/10; 711/112; 709/213
(58) Field of Search .............................. 709/213, 229; 711/112; 707/9, 10

(56) References Cited

U.S. PATENT DOCUMENTS

| | | | |
|---|---|---|---|
| 3,735,360 A | 5/1973 | Anderson et al. ............ 711/149 |
| 5,339,429 A | 8/1994 | Tanaka et al. ............... 712/205 |
| 5,416,921 A | * 5/1995 | Frey et al. .................... 714/11 |
| 5,463,754 A | 10/1995 | Beausoleil et al. .......... 709/213 |
| 5,566,331 A | 10/1996 | Irwin, Jr. et al. ............. 707/10 |
| 5,634,122 A | 5/1997 | Loucks et al. ................. 707/8 |

OTHER PUBLICATIONS

"Shared Memory RAM Disk for a Cluster with Share Memory," *IBM Technical Disclosure Bulletin*, vol. 36, No. 06B, Jun. 1993, 299–300.

"Shared DASD Facility for VM/SP Resource Control on European HONE," Bert Wijnen.

"Shared Virtual Disk for a Cluster of Processors with Separate I/O Devices and Shared Memory," *IBM Technical Disclosure Bulletin*, vol. 36, No. 06B, Jun. 1993, 375–377.

* cited by examiner

Primary Examiner—Kenneth R. Coulter
(74) Attorney, Agent, or Firm—Sawyer Law Group LLP; Noreen A. Krall (57) ABSTRACT

Aspects for read/write data sharing of DASD (direct access storage device) data in a cluster of multiple data processing systems are described. In a method aspect, the method includes utilizing a first system as a managing system for file data modification of at least one file system, the at least one file system including a byte file system. The method further includes controlling access by at least one second system within the cluster of multiple system to data of the at least one file system through global token management, wherein concurrent, direct DASD read/write sharing of data of the at least one file system across the cluster of multiple systems occurs.

31 Claims, 7 Drawing Sheets

System Records

| SY1 | | | | | | |
|---|---|---|---|---|---|---|
| SY2 | | | | | | |
| | | | | | | |
| | | | | | | SY32 |

Mount Records 30

| MountPoint 32 | FileSystem 34 | Owner 36 | FSType 38 | Status 40 | Mode 42 |
|---|---|---|---|---|---|
| / | SYSP.HFS.ROOT | /SY1 | HFS | | R/O |
| /SY1 | SYSP.HFSLOC.SY1 | /SY1 | HFS | | R/W |
| /SY1/tmp | SYSP.TMP.SY1 | /SY1 | HFS | | R/W |
| /SY1/etc | SYSP.ETC.SY1 | /SY1 | HFS | | R/W |
| /SY1/dev | SYSP.DEV.SY1 | /SY1 | HFS | | R/W |
| /SY2 | SYSP.LOC.SY2 | /SY2 | HFS | | R/W |
| /SY2/tmp | SYSP.TMP.SY2 | /SY2 | HFS | unmounting | R/W |
| /SY2/etc | SYSP.ETC.SY2 | /SY2 | HFS | | R/W |
| /SY2/dev | SYSP.DEV.SY2 | /SY2 | HFS | | R/W |
| /SY32 | SYSP.SY32.LOCAL | /SY32 | HFS | | R/W |
| /SY32/tmp | SYSP.SY32.TMP | /SY32 | HFS | | R/W |
| /SY32/etc | SYSP.SY32.ETC | /SY32 | HFS | | R/W |
| /SY32/dev | SYSP.SY32.DEV | /SY32 | HFS | | R/W |
| /Bldpin | COMMON.BLD.HFS | /SY32 | HFS | | R/O |

READ/WRITE DATA SHARING OF DASD DATA, INCLUDING BYTE FILE SYSTEM DATA, IN A CLUSTER OF MULTIPLE DATA PROCESSING SYSTEMS

FIELD OF THE INVENTION

The present invention relates to clustered arrangements of multiple data processing systems, and more particularly to data sharing, including byte file system data, in a clustered arrangement.

BACKGROUND OF THE INVENTION

In today's information technology industry, customers desire systems that have better performance and cost improvements over their current systems, while permitting continued use of their existing applications. High availability is also important given today's rising mobile workforce and ability for global connectivity through the Internet. Current processing system designs for information technology applications must provide scalable, granular growth, and continuous application availability. Clustering technology, such as IBM Corporation's S/390 Parallel Sysplex, has been developed to achieve these design needs.

Figure 1:
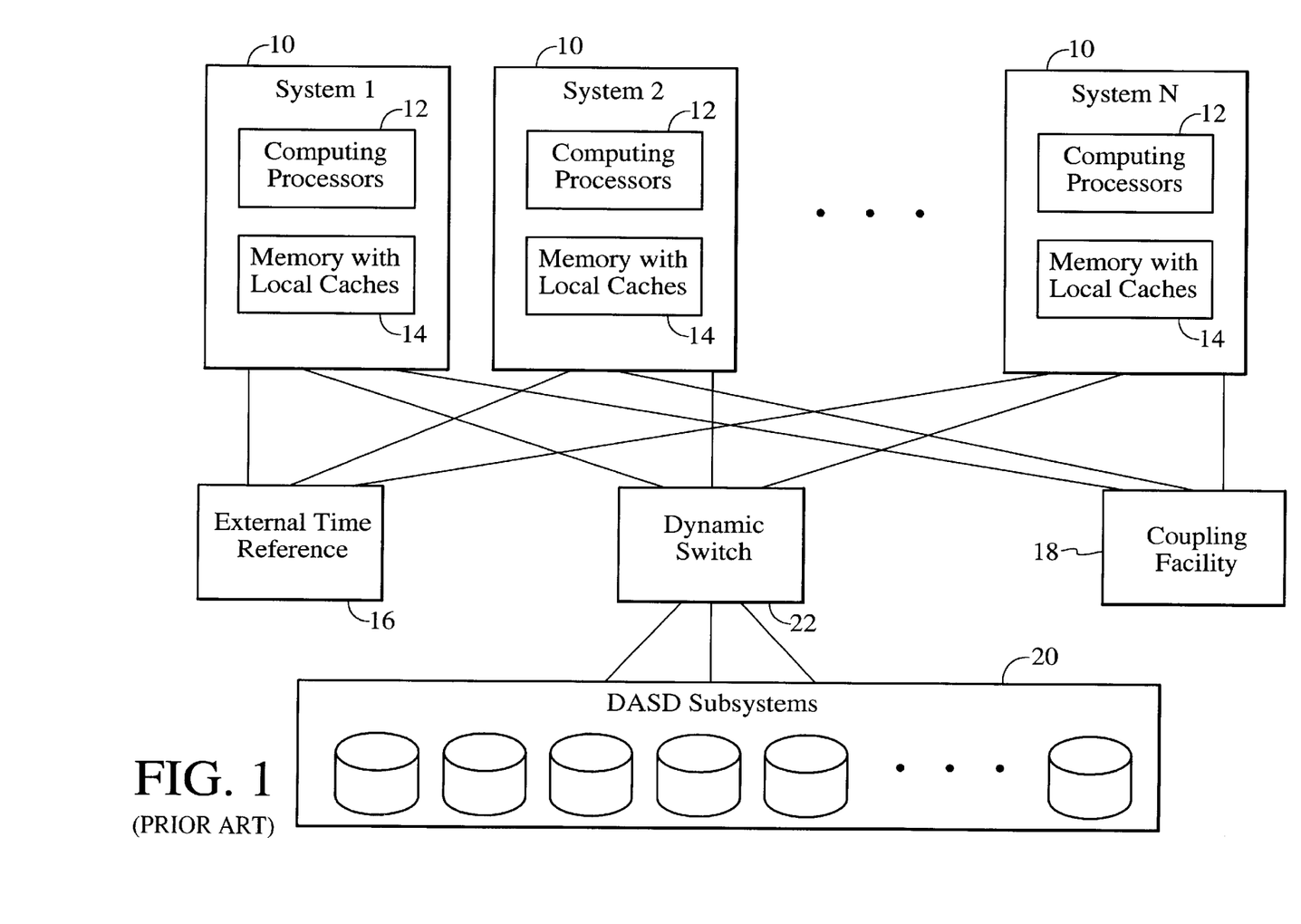
FIG. 1 illustrates a block diagram representation of a prior art clustered arrangement of multiple data processing systems.

A cluster arrangement links individual data processing systems in a manner that creates a single, powerful system, which can support numerous users simultaneously. A cluster offers high availability and excellent scalability. If one system/node in the cluster fails, the other systems in the cluster continue to run. FIG. 1 illustrates a cluster arrangement, e.g., a parallel sysplex system. Multiple systems 10, e.g., System 1 to System N, are included in the sysplex, where each system 10 has one or more computing processors 12 and memory with local caches 14. By way of example, the System/390 Parallel Sysplex from IBM Corporation, Armonk, N.Y., is an example of a set of S/390 systems connected together by a clustering technology. An instance of the operating system, OS/390, runs on each system of the sysplex. Each of the systems access DASD (direct access storage device) 20 that is shared among the systems. The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then run on another system at another point in time. To help facilitate the activity, the systems 10 are each coupled to an external time reference component 16 and a coupling facility 18. Connections to DASD subsystems 20 are facilitated through a dynamic switch 22.

In addition to traditional transaction managers, database managers, and file systems for a multi-system arrangement, a byte file system is desirable in a cluster system. For example, the OS/390 operating system running on each system of the S/390 parallel sysplex includes a UNIX operating system environment for the deployment of UNIX applications. The UNIX file system, i.e., a byte file system, also referred to as an HFS (hierarchical file system), is provided in the base OS/390. However, current HFS implementations do not provide multi-system read/write data sharing. Thus, a need exists for an extension of the scope of an HFS from a single system to multiple systems, particularly, multiple systems arranged in a cluster or parallel sysplex arrangement.

Another challenge facing clustered arrangements is provision of direct access to DASD for shared files. Typically, large overhead is required for message sending of the file data between a file system instance on one system to a file system instance resident on other systems. Thus, for clustered environments, like the S/390 parallel sysplex, a need exists for the utilization of the shared DASD capability of the sysplex arrangement to directly access DASD resident shared files from multiple systems in order to reduce the overhead and increase the throughput of multi-system file sharing.

The present invention addresses such needs.

SUMMARY OF THE INVENTION

The present invention provides for system and method aspects for read/write data sharing of DASD (direct access storage device) data in a cluster of multiple data processing systems. In a method aspect, the method includes utilizing a first system as a managing system for file data modification of at least one file system, the at least one file system including a byte file system. The method further includes controlling access by at least one second system within the cluster of multiple system to data of the at least one file system through global token management, wherein concurrent, direct DASD read/write sharing of data of the at least one file system across the cluster of multiple systems occurs.

Through the present invention, the ability to directly read and write a file from multiple systems is effectively achieved. The shared DASD functions that permit access from multiple systems through the described software protocols/techniques provide the serialization for maintaining full integrity of the file systems across the multi-system data sharing environment. These and other advantages of the aspects of the present invention will be more fully understood in conjunction with the following detailed description and accompanying drawings.

DETAILED DESCRIPTION

The present invention relates to multi-system read/write data sharing in a clustered system arrangement. The following description is presented to enable one of ordinary skill in the art to make and use the invention and is provided in the context of a patent application and its requirements. Various modifications to the preferred embodiment and the generic principles and features described herein will be readily apparent to those skilled in the art.

It should be appreciated that the following discussion refers to an S/390 parallel sysplex arrangement. This is meant as illustrative of a preferred embodiment, the features of which are applicable in other substantially equivalent clustering type arrangements of multiple systems that utilize operations of a byte file system. Thus, the following discussion is meant as illustrative and not restrictive of the aspects of the present invention.

Figure 2:
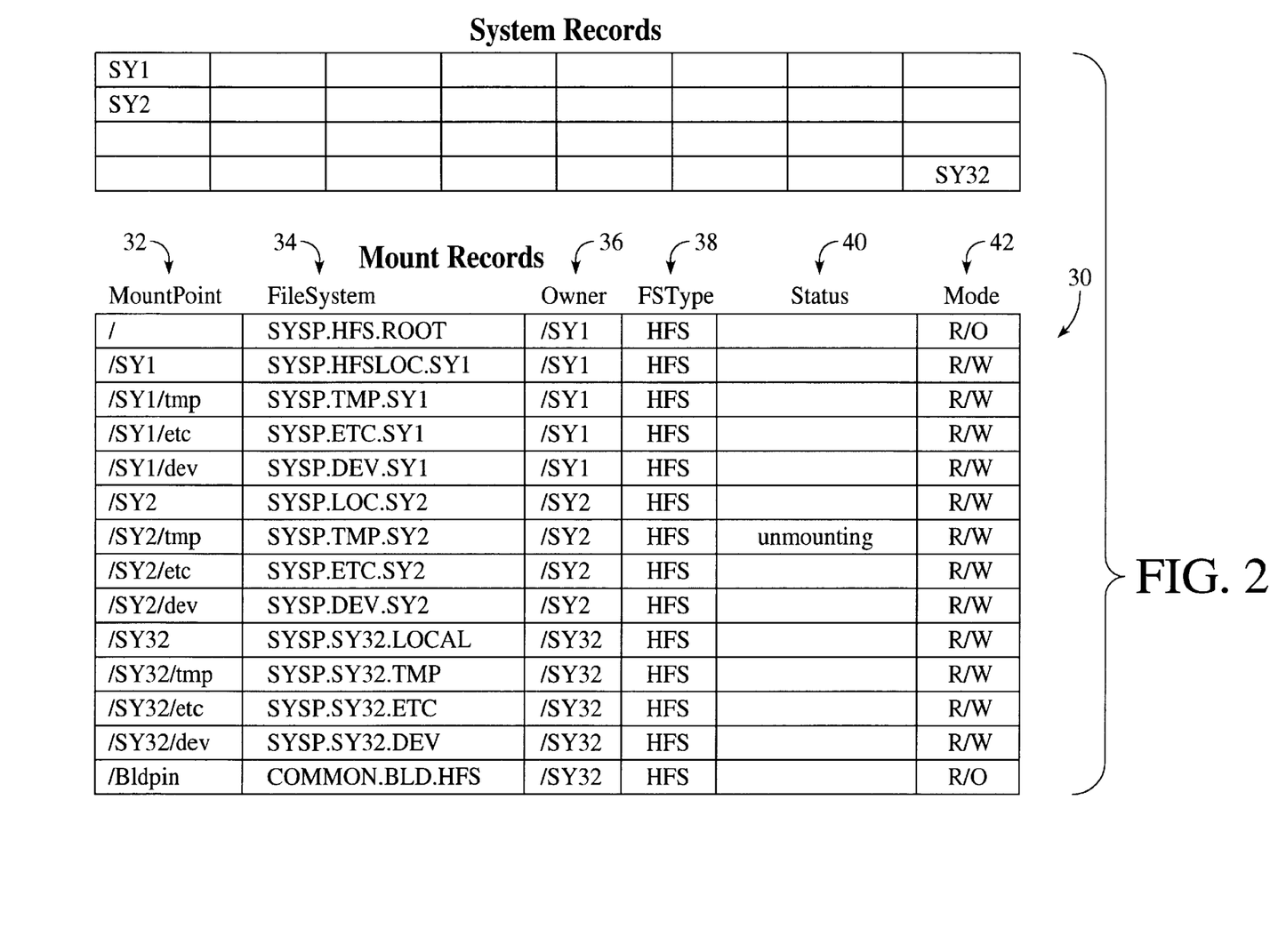
FIG. 2 illustrates a representation of a multi-system mount table in accordance with the present invention.

In order to achieve a shared read/write byte file system in a multi-system clustered environment, the same overall file hierarchy must be seen by all the systems. FIG. 2 illustrates an example of a multi-system mount table 30 in accordance with the present invention that acts to hide multi-system complexity from the applications and system administration of the sysplex. Referring to FIG. 2, for multiple systems records, e.g., SY1, SY2, to SY32, the mount table 30 suitably includes a mount point indicator 32 for each record, and an indicator 34 of the file system to which the record belongs. Also included are an owner indicator 36, a file system type 38, e.g., HFS, NFS (Network File System), a status indicator 40 for the record, e.g., mounting or unmounting, and a mode indicator 42, e.g., read-only (R/O) or read-write (R/W). Through the use of the multi-system mount table, an application or an application instance sees the same file hierarchy independent of which particular system the application executes.

The handling of modified file metadata and file data is another important aspect in achieving a read/write shared byte file system for a sysplex arrangement. The present invention utilizes advantageous features of traditional HFS deferred write of modified metadata and file data, while enhancing the traditional approach for operation in a sysplex environment.

Traditional HFS maintains file system metadata in an index structure on DASD. A shadow write technique is normally used for updating the index, which provides atomic application of an entire set of metadata changes. The atomic shadow write technique insures consistency of the DASD image of all metadata and consistency on DASD between metadata and file data for all files within a byte file system across a system failure that occurs while updating the metadata. The format of metadata stored in DASD is organized and partitioned within the index space to achieve indexed look-up and atomic DASD update through the shared write technique.

Traditional HFS further caches the metadata of directories, symbolic links, and files in local memory, and also caches file data. The in-memory/cache format of the metadata is organized for fast look-up and use of named items, e.g. directory/link/file entries. HFS applies changes to the in-memory metadata structure without immediately reflecting the changes on DASD. Deferring the DASD write of metadata changes, as well as file data changes, is a fundamental method used to achieve file system performance requirements.

In accordance with the present invention, the capability of atomic update of file system metadata is maintained through the use of a single system in the sysplex acting as the manager of modified metadata for any single file system. Preferably, the management function is spread around the multiple systems within the sysplex at the granularity of file system. Thus, each system may be the metadata manager for a set of file systems. The management role for a file system may then be transferred from one system to another system. Therefore, when one system in the sysplex fails, other surviving systems take over metadata management of the file systems that were being managed by the failed system.

In order to achieve such management of metadata in the sysplex, the present invention utilizes a message sending, i.e., function sending, protocol to access metadata that is managed by another system. In general terms, when a system obtains metadata for a file from another system that manages the metadata, a global serialization token is assigned and returned along with the metadata. The global serialization token permits the receiving system to cache and reuse the metadata locally as long as the token has not been revoked. A more detailed explanation of the global token utilization in accordance with the present invention is presented hereinbelow with reference to FIG. 4.

The metadata management with a global token utilizes a form of client/server protocol. The system that manages the modified metadata is called the server. Other systems that access the metadata while it is being managed by a different system are called clients. The client/server roles apply at file system granularity. Thus, for example, a single OS/390 system capably acts as the server, i.e., metadata manager, for a set of HFS file systems, and at the same time, acts as one of a set of clients accessing metadata of file systems managed by other OS/390 systems.

Figure 3A:
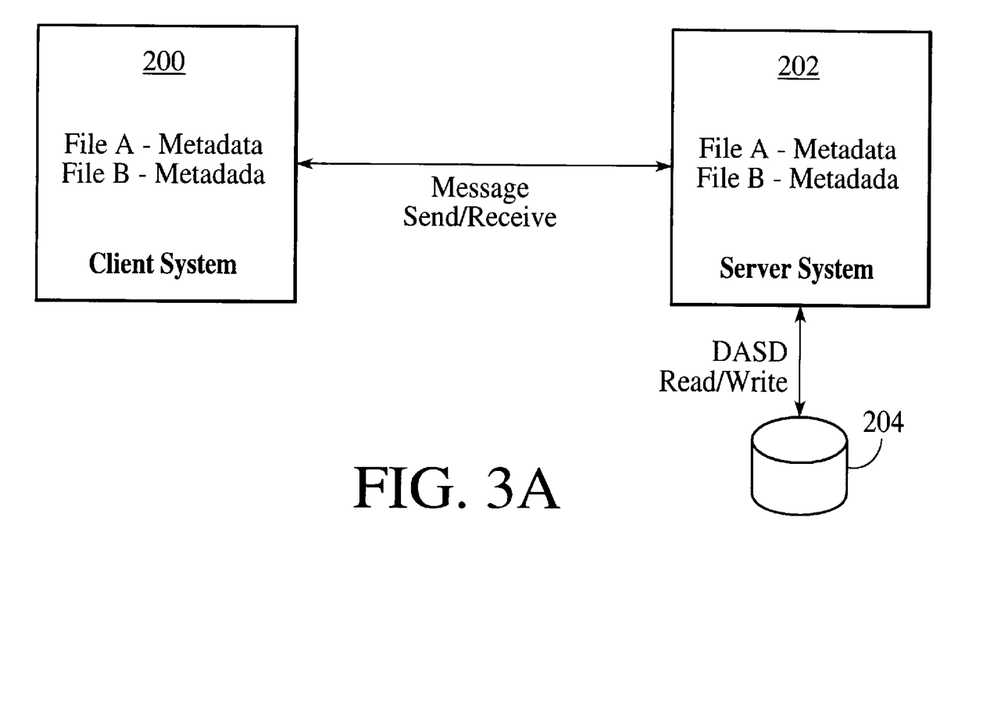
FIG. 3a illustrates a block diagram representation of a client/server system arrangement in accordance with the present invention.
Figure 3B:
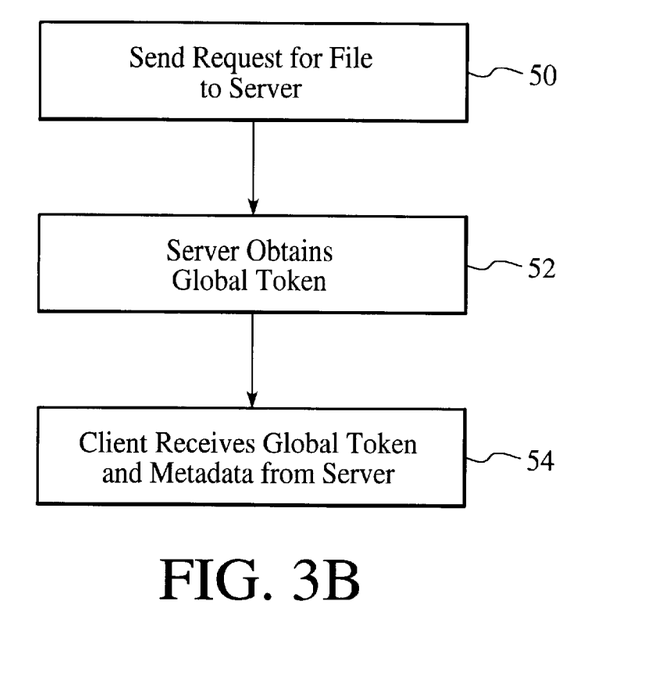
FIG. 3b illustrates a flow diagram of a process for metadata access control in accordance with the present invention.

FIG. 3a illustrates a block diagram representation of a client/server system arrangement for metadata access with a process for client/server protocol shown in the block flow diagram of FIG. 3b in accordance with the present invention. On first reference to a file, e.g., File A, on a system that is not the metadata manager for that file, that system, i.e., the client system, 200 sends a message request to the system, i.e., server system 202, that does act as the metadata manager for that file. The client system 200 requests permission to reference the file (step 50). The server system 202 obtains a global token on the file on behalf of the client system 200 (step 52). The global token insures that the client system 200 receives the most current and consistent metadata for the file. The server 202 thus sends a response message to the client system 200 that includes the global token and the metadata of the file (step 54).

The file metadata preferably includes a page map, which the client system 200 uses to access the file data from DASD 204. The client system 200 creates an in-memory structure to represent the file and places the metadata in the structure. The structure is connected to an in-memory file look-up structure, which allows future reference/use of the file by the client system 200 and validity checking of the file global token without having to communicate with the server system 202.

The global token technique acts as the mechanism for performing cross-system serialization of file system items. Global tokens are assigned and managed by the server system that manages the metadata of the file system in which the corresponding file system items exist. The server uses local single-system serialization methods to maintain the state of the global tokens.

Figure 4:
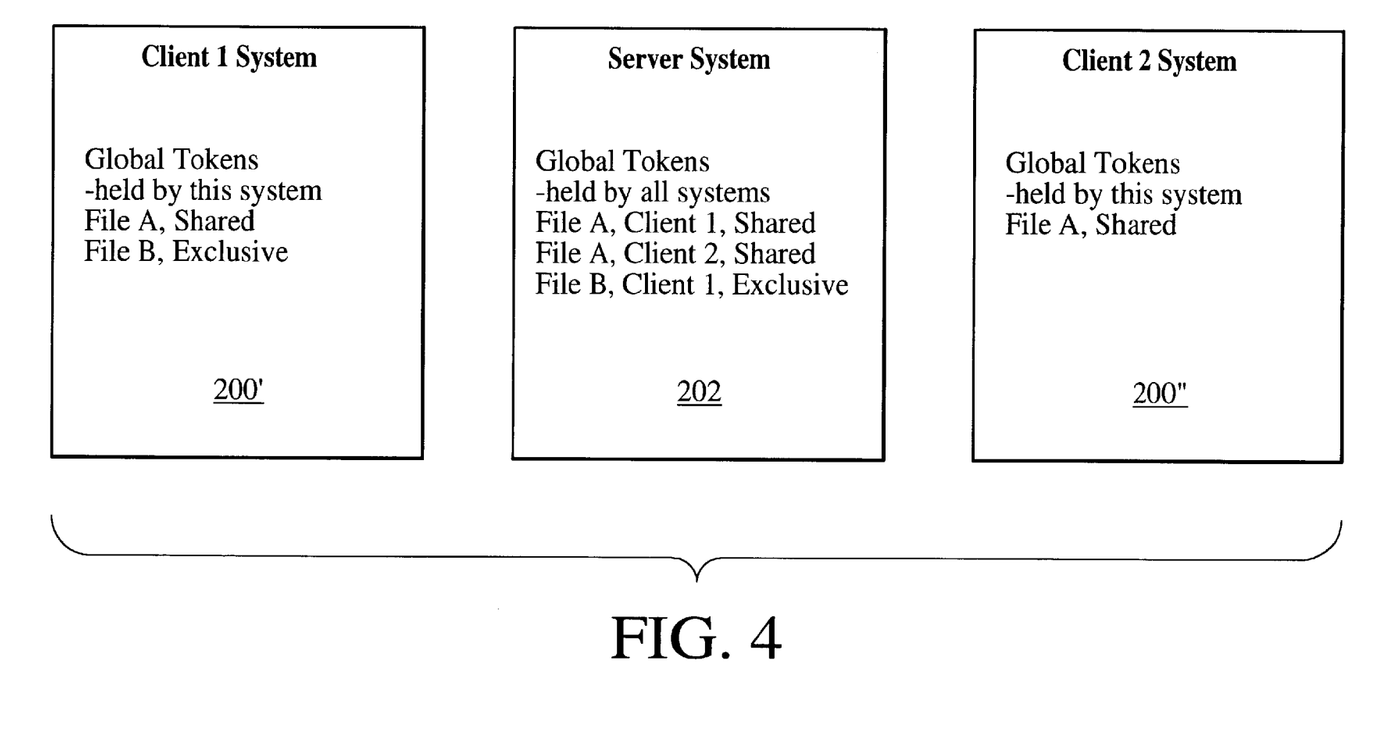
FIG. 4 illustrates an example of global token status management in accordance with the present invention.

Two types of global tokens, SHARED and EXCLUSIVE, are used in a preferred embodiment. Multiple clients may concurrently hold SHARED global tokens on the same item, while only one client system at a time may hold an EXCLUSIVE global token. The SHARED global token allows the client system to read, use, and locally cache the file. While an EXCLUSIVE global token is held, no client may hold a SHARED global token on the file. The EXCLUSIVE token gives the holding system permission to modify the corresponding file. As shown in the example of FIG. 4, a client system 200' holds a SHARED global token on File A and an EXCLUSIVE global token on File B. A second client system 200" also holds a SHARED global token on File A. Server system 202, acting as the manager for File A and File B, tracks the global token status for client systems accessing the files, and thus, marks File A as having SHARED global token status for client systems 200' and 200" and marks File B as having an EXCLUSIVE global token status for client system 220.

Two cases of incompatible global tokens for a file system item are possible. In a first case, one or more SHARED global tokens exist for the file, when a request for an EXCLUSIVE global token is processed. In a second case, an EXCLUSIVE global token exists for the file and a request for a SHARE or EXCLUSIVE global token is processed.

Thus, when reference to the file on a client system 200 includes modification of file data, the client system 200 first requests permission for write access from the server 202 that owns the file's metadata. The client system 200 therefore sends a message to the server 202 requesting write access to the file. When the server 202 determines that assigning a new global token, i.e., EXCLUSIVE token, for a file would be incompatible with existing global token(s) for the file, the server 202 revokes the existing global token(s). A revoke token message is sent to the client(s) that hold the existing global token(s). The client system(s) process the revoke message using local serialization to synchronize the revoke with any local access/use of the file corresponding to the token. The client system(s) then mark the in-memory structure that represents the file to show that there is no valid global token for the file. The client system(s) send a message to the server 202 indicating completion of the revoke processing. When the server 202 receives a revoke completion message for each revoke message it sent, the server 202 assigns or grants a new token, i.e., an EXCLUSIVE token, to the requestor client system, so that the requestor client system can obtain write access to the file.

This process results in assigning an EXCLUSIVE global token on the file to the client that made the request to write. The server assigns new data pages, i.e., DASD space, for use by the writing client, and sends a response message communicating the new data pages to the client. The client updates its in-memory structure for the file and may now write to the file. Reading and writing to the file may continue as long as the file global token remains valid.

The case of revoking an EXCLUSIVE global token on a file includes the following additional processing by the client system and the server system. Since an EXCLUSIVE token gives the client system permission to modify the file and the file's metadata, any modifications must now become visible to all systems. Thus, when the server system sends the token revoke request to the client system with the EXCLUSIVE token, that client system processes the revoke request by writing to DASD any data modifications it has made to the file. The client system then sends the revoke complete message to the server system. The revoke completion message also includes the client's changes to the file's metadata. The server system receives the revoke completion message and updates its in-memory changes of the file's metadata to include the client's changes. All systems now see the latest copy of the file and its metadata.

In order to provide performance optimization of caching in local memory, writing of changed file data and changed metadata is deferred. By deferring the write to DASD, modifications can accumulate and be written to DASD more efficiently using chained DASD write operations. The deferred write technique is suitably used on both the client systems and the server systems of the sysplex.

Figure 5:
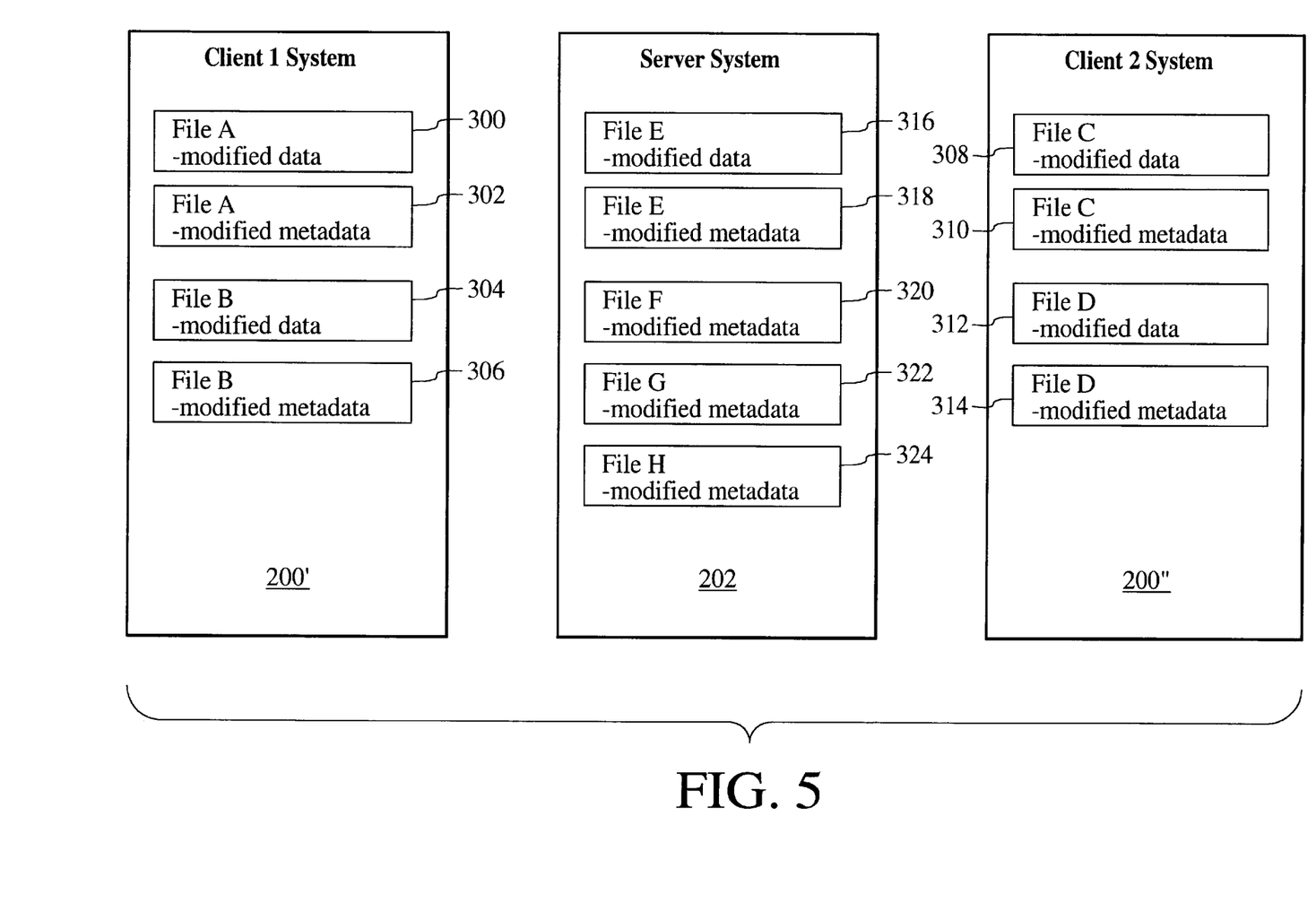
FIG. 5 illustrates an example of file data changing with a deferred write operation in accordance with the present invention.

The EXCLUSIVE global file token held by a client system enables a deferred write of changes to the file's data and/or metadata. While the client system holds the EXCLUSIVE global token, no other system is accessing the file or its metadata. Deferring the writes does not introduce a file system consistency or integrity problem. When the client system completes its changes to a file and the file's metadata, it places its in-memory structure that represents the file on a deferred write queue. Periodically, a write daemon executes on the client system to process the deferred write queue, as is well understood by those skilled in the art. The daemon process writes to DASD any deferred write data for the file and then sends a copy of the file's metadata changes to the server. Thus, for Files A, B, C, D, E, F, G, and H illustrated in the example of FIG. 5, the write daemon of a client system 200' writes the modified data 300 for File A and the modified data 304 for File B to DASD (not shown) and sends messages containing the modified metadata 302 for File A and the modified metadata 306 for File B to server 202. Similarly, the write daemon for client 200" writes the modified data 308 for File C and the modified data 312 for File D to DASD (not shown) and sends messages containing the modified metadata 310 for File C and the modified metadata 314 for File D to server 202. In addition to the periodic action of the write daemon, revocation of the EXCLUSIVE global token on a file also triggers a client system to write to DASD any modified data for the file and copy the file's metadata changes to the server.

A server system also accumulates in-memory modified file data and modified metadata. Similar to the clients, the server uses a deferred write queue and a write daemon to periodically write changes to DASD. Thus, for FIG. 5, the server 202 system's write daemon writes the modified data 316 and metadata 318 for File E to DASD and the modified metadata 320, 322, and 324 for Files F, G, and H to DASD.

Figure 6:
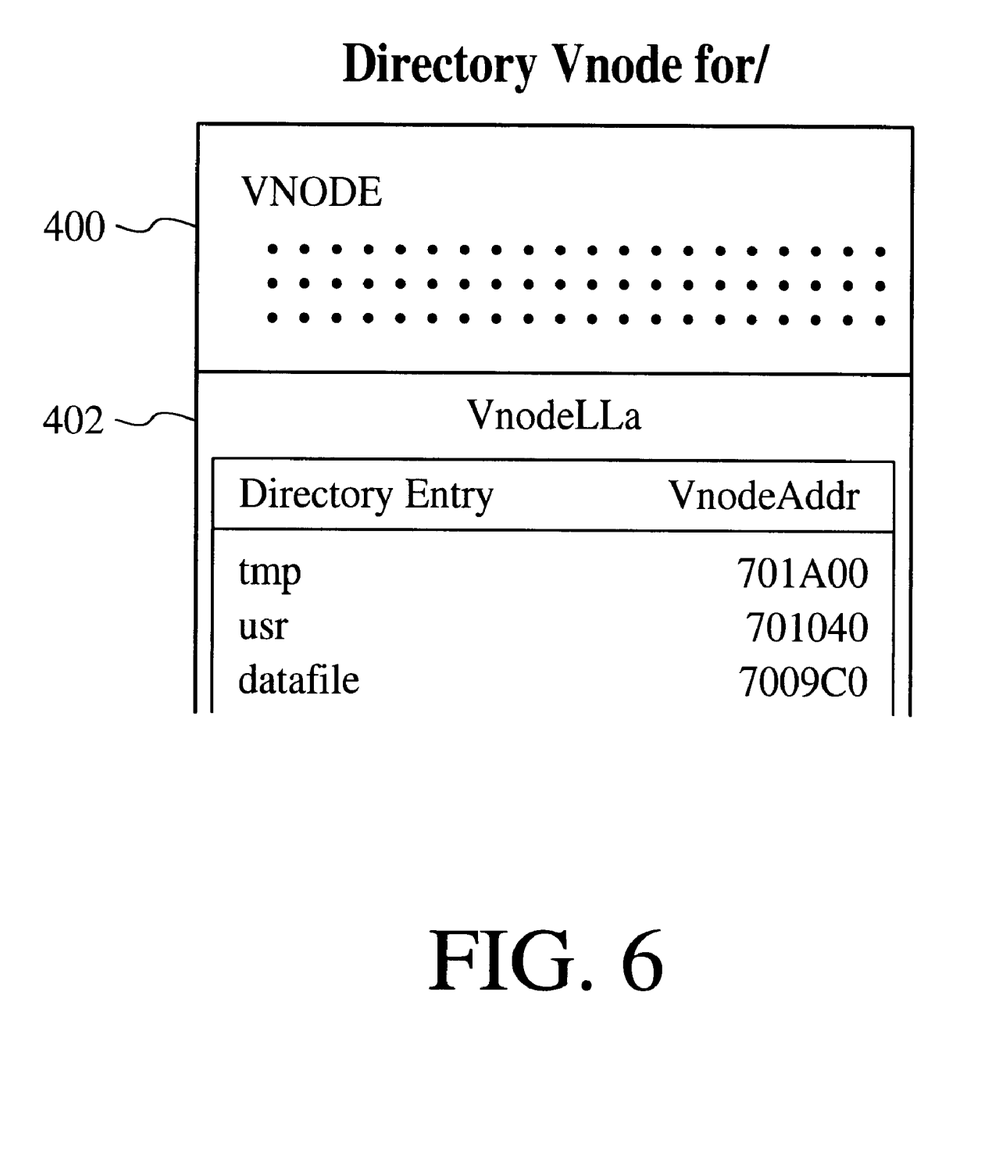
FIG. 6 illustrates a directory look-up look-aside structure in accordance with the present invention.

To improve the performance of look-up requests, each system in the sysplex maintains in its local memory a directory look-aside for each file system directory that it has recently referenced, as described with reference to FIG. 6. FIG. 6 illustrates an example of a directory 400 for a client system/node, e.g., Vnode. Included in the directory 400 is a directory look-up look-aside table 402, e.g, Vnode LLa. The directory entries, e.g., tmp, usr, datafile, of the LLa table 402 suitably reference a memory address, e.g., VnodeAddr, for each entry. When a client system/node performs its first look-up in a directory, it has no local information for the directory and therefore must function ship the request to the server. The server then returns metadata for the referenced directory. The metadata includes the directory FSP (file security packet). The client system then creates the in-memory structure to represent the directory and places the metadata in the structure. With the copy of the metadata and FSP, the authority of a requestor trying to access the directory can be readily checked, as is well understood by those skilled in the art.

When metadata for a directory is changed, the server function suitably sends a copy of the updated metadata to all clients. The clients refresh the metadata in their in-memory structures that represent the directory. Further, when the server removes an entry from a directory, the server preferably broadcasts a message to all clients telling them to invalidate any directory look-aside copy of the entry.

In a preferred embodiment, global tokens are not used to serialize client directory look-asides. Serialization is not utilized, since the information is only used for look-up and the look-up process realizes that entries are sparse and potentially stale. The look-up process naturally corrects itself. A look-up miss on the look-aside results in a function ship of the request to the server. The server has complete and current information and uses serialization to correctly complete the look-up. If the client look-up gets a hit on its look-aside and the file corresponding to the found name has actually been deleted, subsequent attempt to access the file provides the discovery that the file has been deleted.

As previously mentioned, continued access by client systems to files managed by a server when the server fails is provided in the sysplex arrangement of the present invention. The continued access is accomplished by one of the surviving, non-failing systems taking over and becoming the server. File system granularity is used to achieve the acquisition of server function management in the surviving systems. Since a server system acts as the server for many file systems, upon its failure, preferably one of the remaining systems becomes the server for some of the file systems, while other systems become the server for others of the file systems originally handled by the failing server.

Figure 7:
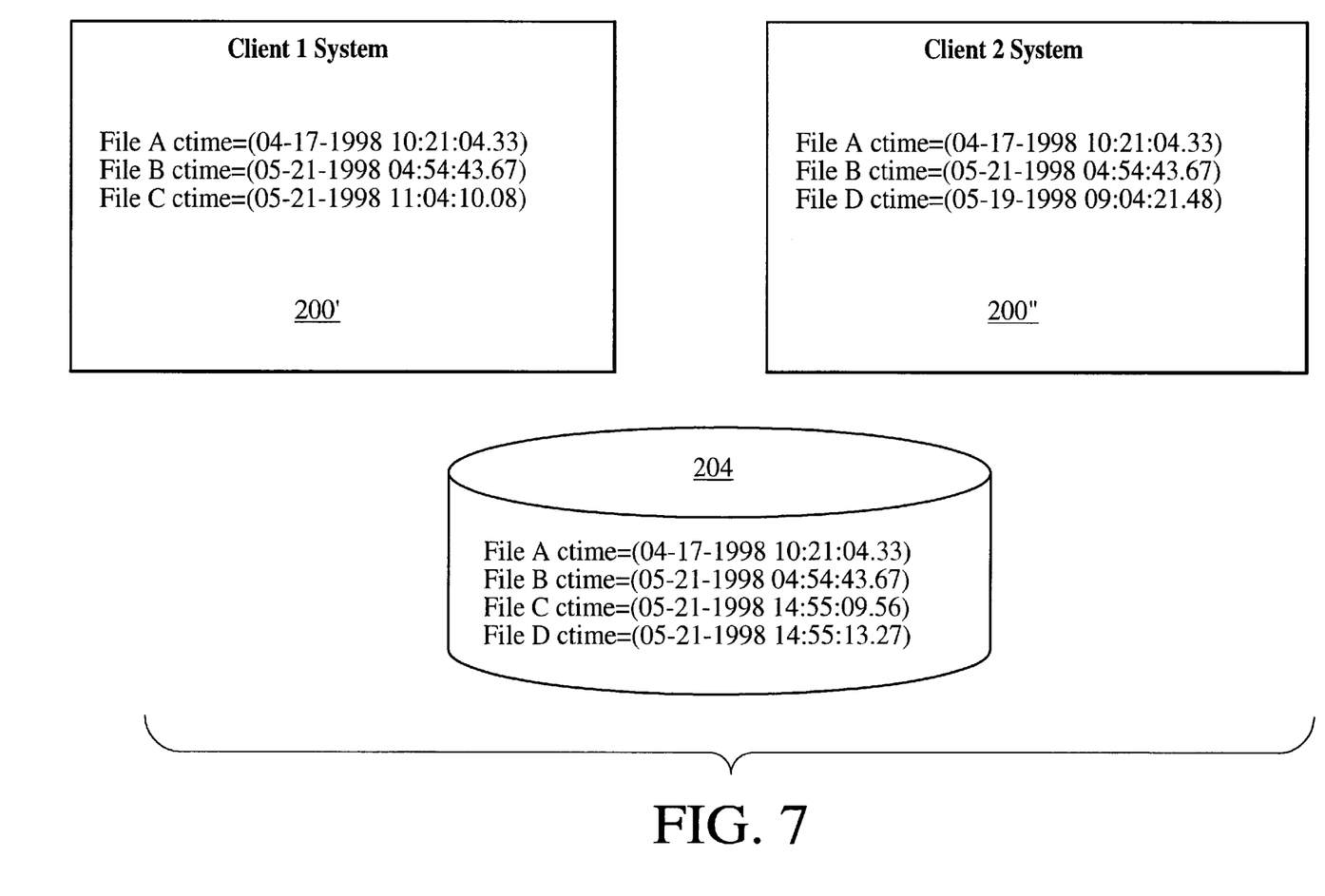
FIG. 7 illustrates an example of ctime utilization in accordance with the present invention.

At the time of a server failure, the client systems of that server typically have locally cached metadata and file data for file systems that were managed by the failed server. The present invention attempts to preserve validity of that cached information by using the file attribute ctime (change time), as illustrated with reference to FIG. 7.

The client copy of metadata for a file includes the ctime value. Upon failure of a server, the client systems become aware of the failure. The client systems then participate in recovery actions that result in a new server for the file system. When the new server is established, the client systems make requests to the new server to send the clients a copy of the metadata as stored on DASD 204 for each file whose metadata they have locally cached. For the example of FIG. 7, client 200' requests metadata for Files A, B, and C, while client 200" requests metadata for Files A, B, and D. When the client systems receive the metadata, the client systems compare the ctime of the metadata received with the ctime in their locally cached copy. If the times are equal, the cached metadata and any cached data for that file remains valid. The new server preferably assigns a new global token for the file and returns the token to the client. The global token permits the client system to continue using the file with the failure transparent to applications accessing the file. If the ctimes are not equal, e.g., as for Files C and D of FIG. 7, the newer metadata is used to update the cached metadata to ensure that file consistency is maintained.

Through the present invention, the ability to directly read and write a file from multiple systems is effectively achieved. The shared DASD functions that permit access from multiple systems through the described software protocols/techniques provide the serialization for maintaining full integrity of the file systems across the multi-system data sharing environment.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for read/write data sharing of DASD (direct access storage device) data in a cluster of multiple data processing systems, the method comprising:
   utilizing a first system as a managing system for file data modification of at least one file system, the at least one file system including a byte file system;
   controlling access by at least one second system within the cluster of multiple system to data of the at least one file system through global token management, wherein concurrent, direct DASD read/write sharing of data of the at least one file system across the cluster of multiple systems occurs.

2. The method of claim 1 further comprising utilizing a mount table, the mount table providing a same file hierarchy for all systems in the cluster of multiple systems.

3. The method of claim 1 further comprising utilizing one of the at least one second system as the managing system when a failure occurs in the first system.

4. The method of claim 3 further comprising utilizing a change time value associated with each file to ensure validity of data on the at least one file system among remaining active systems in the cluster of multiple systems.

5. The method of claim 1 wherein controlling access further comprises sending a request by a second system for access to a file on a file system managed by the first system, and identifying in the first system if access to the file is possible based on a global token status for the file in the first system.

6. The method of claim 5 providing read access using a shared global token assignment.

7. The method of claim 5 providing write access using an exclusive global token assignment.

8. The method of claim 6 wherein providing read access further comprises determining whether an incompatible global token assignment is already present for the file and denying access when an incompatible global token assignment is present.

9. The method of claim 7 wherein providing write access further comprises determining whether other global tokens are held on the file and revoking the other global tokens being held on the file.

10. The method of claim 9 wherein revoking comprises revoking an exclusive global token for a second system, receiving changes to the metadata of the file by the second system, and updating an in-memory copy of the metadata in the first system to include the changes.

11. The method of claim 10 further comprising writing the changes to the metadata to DASD by the second system.

12. The method of claim 5 wherein when the first system does provide access, the method further comprises sending a response to the request, the response including a valid global token and metadata for the file.

13. The method of claim 12 further comprising creating an in-memory structure for the metadata in the second system, and connecting the in-memory structure to a look-up structure in the second system.

14. A method for achieving shared read/write of file data on DASD (direct access storage device) in a multi-system clustered arrangement, the method comprising:
   creating a client/server protocol for file access, including byte file access, within the multi-system clustered arrangement with any one of the multiple systems acting as a managing server of files and controlling read/write access to the files by others of the multiple systems through the use of global tokens; and
   utilizing a deferred write process with caching to optimize performance when changes are made to an accessed file.

15. The method of claim 14 wherein utilizing a deferred write process further comprises writing modifications of file data and file metadata through chained DASD write operations.

16. The method of claim 15 further comprising placing an in-memory structure representing the file, including changed file data and metadata, on a deferred write queue.

17. The method of claim 16 further comprising utilizing a write daemon process to periodically write data from the deferred write queue to DASD.

18. The method of claim 14 transferring management of a file system from a server system to a client system when the server system fails, wherein the client system becomes a new server system for the file system.

19. The method of claim 14 wherein creating a client/server protocol further comprises utilizing shared and exclusive global tokens for management by a server of file data access by a client.

20. The method of claim 19 wherein a shared global token status provides read access by one or more client systems.

21. The method of claim 19 wherein an exclusive global token status provides write access by one client system.

22. A system of multiple data processing systems in a cluster arrangement with shared DASD (direct access storage device) read/write access, the system comprising:
   a plurality of direct access storage devices (DASDs), the plurality of DASD storing a plurality of file systems, including byte file systems;
   a first data processing system, the first data processing system coupled to the plurality of DASDs and acting as manager of file data modification for at least one file system through global token management; and
   a plurality of second data processing systems, the plurality of second data processing systems coupled to the first data processing system and the plurality of DASDs, the plurality of second data processing systems attempting to access a file system managed by the first system, wherein concurrent, direct DASD read/write data sharing occurs.

23. The system of claim 22 wherein the first data processing system comprises an S/390 system.

24. The system of claim 23 wherein the plurality of second data processing systems each comprise an S/390 system.

25. The system of claim 24 wherein the byte file system comprises a UNIX file system.

26. The system of claim 22 further comprising a mount table, the mount table providing a same file hierarchy for the first data processing system and the plurality of second data processing systems.

27. The system of claim 22 wherein one of the plurality of second data processing systems acts as a manager of the at least one file system when the first data processing system fails.

28. The system of claim 22 wherein one of the plurality of second data processing systems requests access to the at least one file system and the first data processing system determines a global token status for the at least one file system in response to the request.

29. The system of claim 28 wherein the first data processing system provides a shared global token for read access and an exclusive global token for write access.

30. The system of claim 28 wherein the first data processing system revokes global tokens held on the at least one file system when an incompatible global token status exists for a current request.

31. The system of claim 22 wherein the first data processing system and plurality of second data processing systems utilize a deferred write process with local caching to optimize performance when changes are made to an accessed file system.

* * * * *